April 3, 1956 G. KLEEFELD 2,740,954

VIEWING PLATE FOR TELEVISION SCREEN

Filed Jan. 19, 1953

INVENTOR
GEORGES KLEEFELD
BY Mock & Blum
ATTORNEYS

United States Patent Office 2,740,954

Patented Apr. 3, 1956

2,740,954

VIEWING PLATE FOR TELEVISION SCREEN

Georges Kleefeld, New York, N. Y.

Application January 19, 1953, Serial No. 331,950

8 Claims. (Cl. 340—369)

My invention relates to new and improved optical means for viewing a television image which is produced on the face or screen of a picture tube of a television receiver. The invention is also useful for other purposes.

As is well-known, the television frame of a picture tube of a television receiver has a raster which consists of a series of horizontal scanning lines. According to standard practice in the United States of America, the standard television frame has a raster of 525 horizontal lines.

These parallel scanning lines, which are of equal length and width, produce a coarse and objectionable visual effect, especially if the picture is large or if it is enlarged by projection, or if the observer is close to the front of the front glass wall of the picture tube.

Various lens systems have been proposed for eliminating or minimizing the objectionable visual effect of the raster lines, as in U. S. Reissue Patent No. 22,115 dated June 16, 1942; U. S. Patent No. 2,229,302 dated January 21, 1941; U. S. Patent No. 2,254,057 dated August 26, 1941; No. 2,415,226 dated February 4, 1947; No. 2,307,210 dated January 5, 1943; and No. 2,531,399 dated November 28, 1950.

According to my invention, each scanning line is optically resolved into a series of dots or areas which are optionally and preferably identical and equally spaced from each other. These dots or areas are preferably virtual images.

For this purpose, I may use a series or system of cylindrical lenses or lenses which have partial cylindrical faces, such as plano-cylindrical lenses, each of which has a planar face and a convex face. Each lens may have the shape of half of a cylinder. These lenses may have parallel longitudinal lens axes. These lens-axes may be straight or curved. If these lens-axes are curved, said lens-axes may be parts of circles. Said curved lens-axes may have the same curvature in all the lenses of said system or said lens-axes may have different respective curvatures in different lenses of said system.

If the lens axes are curved, they may be located in respective parallel planes.

The lens system is provided or located in any selected part of the picture tube, or said lens system may be associated with any selected part of the picture tube. Thus, said lens system may be an integral part of the outer or inner face of the front wall of the picture tube, or the lens system may be an attachment which is applied to the front wall of the picture tube or which is located close to said front wall.

If the lens axes are straight, said axes are held laterally inclined to said raster lines, so that each lens axis makes an acute angle and an opposed obtuse angle with said raster lines. Said acute angle is optionally and preferably a maximum of 45° and it may be 30° to 35°. Said straight lens axes may be in the same plane, which may be parallel to the common plane of the raster lines.

If the lens axes are curved or otherwise not straight, the respective parallel planes in which such lens axes may be located, may be held perpendicular to the common plane of the raster lines, and such axis-planes of said axes are also held laterally inclined to said raster lines, so that each axis-plane is laterally inclined to the raster lines at opposed obtuse and acute angles. In such case, the acute angles also optionally and preferably have a maximum of 45°, and such acute angle may be 30° to 35°.

The lens system forms a plurality of virtual images of each raster line. This important result is secured by holding the lenses laterally non-parallel and non-perpendicular to the parallel raster lines.

The principle of the invention is further explained in the annexed description and drawings.

In a part of the following disclosure, it is assumed that the raster is formed in a planar transparent phosphor screen which is at the inner planar face of the flat front wall of a cathode ray tube, in which case all the parallel raster lines are in the same plane, and an embodiment of the invention is disclosed as an attachment or auxiliary viewing or scanning device which is applied to the planar outer face of said front wall of the cathode ray tube, which is parallel to the plane of the raster lines, or said auxiliary or scanning device is held in front of said outer face.

The device may be made a part of the picture tube or cathode-ray tube, or the device may be associated with the picture tube or cathode-ray tube in any of the ways disclosed in the above-cited patents, or in any other manner which is suitable to get the desired result.

Figure 1:
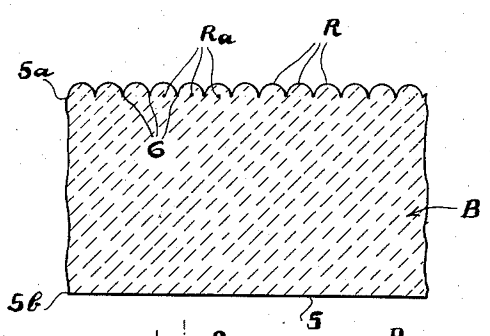
Fig. 1 is a vertical section of a device which has straight and parallel longitudinal lens-axes, said section being in a plane which is perpendicular to the lens-axes, which are straight and parallel and in the same plane in this embodiment.
Figure 2:
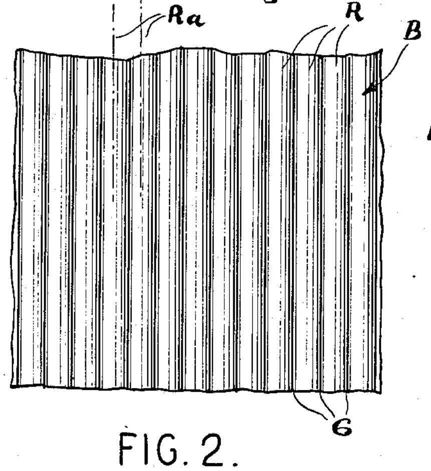
Fig. 2 is a top plan view of Fig. 1.
Figure 3:
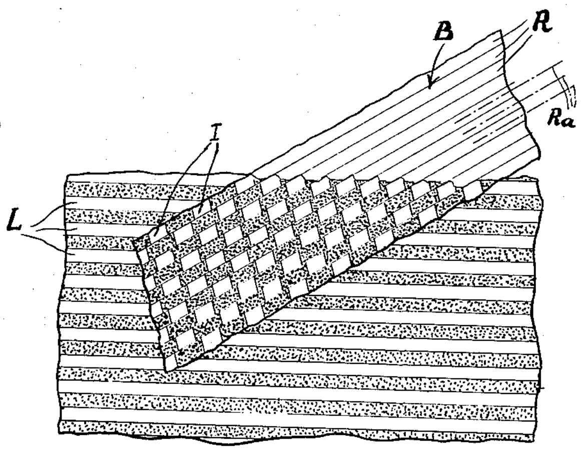

Fig. 3 is a diagrammatic plan view, which shows straight and parallel lens-axes in a horizontal plane which is parallel to the horizontal plane in which it is assumed that the raster lines are located, said lens-axes being laterally inclined to the raster lines and Fig. 3 also shows the resulting images produced by the optical system, whereby a raster line is viewed as though it originally consisted of said separated dots or areas.

Figure 4:
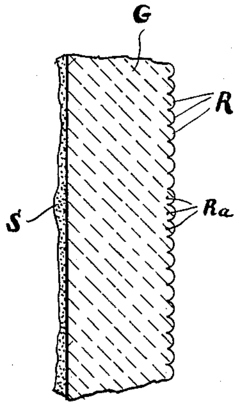

Fig. 4 shows the ribs or lenses formed in the front or outer face of a planar front glass wall of a picture tube or other cathode-ray tube. The parallel lens-axes are transverse to the plane of Fig. 5 and in the same vertical plane, which is parallel to the phosphor screen.

Figure 5:
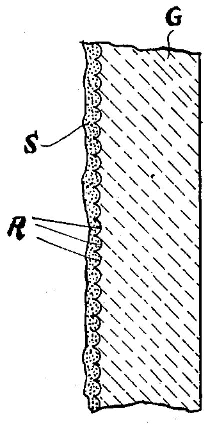

Fig. 5 shows the ribs or lenses formed in the rear or inner face of said front glass wall.

Figure 6:
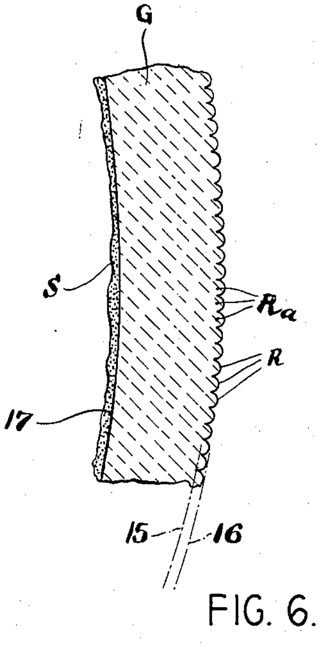

Fig. 6 shows the ribs or lenses formed in the front or outer face of a front glass wall of a picture tube or other cathode-ray tube, in which said glass wall is arched and has the shape of a part of a cylinder or sphere or other arched or convexo-concave shape.

In one embodiment, the device is incorporated in a block B which is made of glass or methyl methacrylate or other transparent or light-permeable material.

This block B has a planar rear face or wall 5, which may abut the front or outer planar face of the front flat and planar glass wall of a picture tube, which has a planar phosphor or fluorescent screen S at its rear or inner face.

The lenses R are formed in the front face of block B so as to provide integral longitudinal ribs or ridges. These lenses R can be formed in any suitable manner, such as by initial molding, or by shaping an initial face of block B which is planar and parallel to face 5.

Each said lens R is preferably convexo-planar in cross-section with its convex face outermost. Optionally, the inner face of lens R may also be convex. Optionally and preferably, each lens R has the shape of a half-cylinder.

The longitudinal lens-axes R*a* are straight, parallel to each other, and they are in a common plane which is parallel to planar face 5.

As one example, but without limitation thereto, each lens R is one-half of a cylinder whose diameter is four-tenths of a millimeter. The lenses R are identical. In this example, there are approximately 63 lenses R per inch, as measured in a direction perpendicular to the lens-axes R*a*.

In the use of lenses R in this example, the planar face 5 abuts the outer planar face of the front glass wall of a picture tube, so that face 5 is close to the raster line L which are formed on a planar phosphor or fluorescent screen S which is located at the inner face of said glass wall. It is assumed that this planar phosphor screen S is parallel to face 5, so that the parallel raster lines L are in a plane parallel and close to the plane of face 5. These raster lines L are luminous or light-emitting stripes or lines, which have equal widths. For convenience, it is assumed that the luminous stripes or lines L abut the face 5 of block B.

The longitudinal parallel edges 6 of the lenses R abut each other or are very close to each other. If the adjacent longitudinal edges 6, which are parallel to the longitudinal lens-axes R*a*, are spaced from each other, such spacing may be a small fraction of the radius of curvature of the lenses R, which is two-tenths of a millimeter in this example.

In Fig. 4 the inner face of the planar glass wall G of the picture tube is vertical and planar and the phosphor screen S is vertical and planar and it abuts the inner vertical and planar face of glass wall G. The ribs or lenses R are formed in the outer face of glass wall G. These ribs R have straight parallel axes R*a* in Fig. 4 and said axes R*a* are in a vertical plane which is parallel to the plane of screen S. It is assumed that the raster strips or lines L are horizontal and parallel and perpendicular and transverse to the plane of Fig. 4, and that all the parallel raster strips or lines L are in the same vertical plane. The lens-axes R of the lenses or ribs R are suitably laterally inclined to the raster strips or lines L in Fig. 4 so that the acute lateral angles which said lens-axes R form with strips or lines L may be 30° C. to 35° C., as shown in Fig. 3.

Fig. 5 is the same as Fig. 4, save that the lenses or ribs R are formed in the inner face of glass wall G.

Preferably, the raster lines L are sufficiently horizontally spaced from the lens-axes so that the lenses R form virtual images of the raster strips or lines L externally of the picture tube or cathode-ray tube.

Fig. 6 shows a front glass wall G of a picture tube, which has an inner face 17. This inner face 17 is arched. It usually has the shape of a part of a sphere. For convenience, it is assumed that said glass wall G has an original outer face 16 which has the shape of a part of a sphere which is concentric with the sphere of of which inner face 17 is a part, and that the ribs R are formed in said original outer face 16 by cutting or grinding. The screen S also has the shape of a part of a sphere, which has the same center as the spheres which correspond to faces 17 and 16.

In this case, the lenses also have identical radii of curvature as in the preceding embodiments, but each rib has a curved axis. In Fig. 6, the edges or tips of the lenses R are at a part-spherical surface 15 which is concentric with faces 17 and 16.

The raster lines L are formed on the arched screen S and it is assumed that they are horizontal and perpendicular to the plane of Fig. 7.

The curved lens-axes of lenses R are in parallel planes which are laterally inclined to the raster lines L, so as to form suitable inclined lateral angles. Thus, the straight axes R*a* in Fig. 3 may be assumed to be the traces of the planes of the curved lens-axes of Fig. 6.

As one illustration of the principle of my invention, it is assumed that the parallel lines or strips L in Fig. 3 are in a horizontal plane, and that the planar face 5 of block B abuts the plane of lines or strips L and that the axes R*a* of lenses R are straight and in a horizontal plane, and that said axes R*a* are parallel to the lines or strips L, and that the median line of each line or strip L registers with a respective lens R. The observer is above lenses R. In this illustration, the median line of each line or strip L may register with the respective lens axes R*a*. In such case, if respective virtual images of lines L are formed by lenses R, each virtual image will register vertically with the respective line or strip L. The formation of virtual images is highly preferred. Each virtual image will have the same direction as the respective registering line or strip L. The width of each virtual image will be greater than the width of its respective line L. It is assumed that the lines or strips L are of equal width and that they are equally spaced from each other. This test may be made with raster lines L or with a series of printed lines or strips.

If the lens system is now turned laterally counterclockwise to the position of Fig. 3 from the original parallel position of the lens system, each lens R will now register vertically with a respective part or section of each line L which is at bottom or inner face 5. A series of virtual images I are thus produced. Each virtual image I is an image of the respective registering line-part or line-section. These virtual images I are inclined upwardly and to the left of the respective lens-axis R. If the test is made with thin printed lines which are spaced from each other by distances which greatly exceed the widths of these lines, the respective virtual images I are thin lines and said virtual images are parallel to each other and upwardly inclined to the left, relative to the original lines L. The effect is the same as if these virtual images had been laterally turned clockwise around a vertical axis, namely, in a direction reverse to the direction of lateral turning of the lens system. The effect is the same as though, as viewed in Fig. 3, the left tip of each line-section is raised from the respective original line, and as though the right tip of each line-section had been lowered from the respective original line.

The virtual images of a single thin line thus comprises a series of straight virtual images which are parallel to each other and which are spaced from each other in the direction of the original straight line.

If the outline of a square is viewed while the four lines of said outline are inclined to axes R*a*, each of the four lines of said figure similarly provides a respective series of virtual images.

If a thin line is viewed when said line is in the position of Fig. 3 relative to lenses R, it may be assumed that line is drawn from the tip of each line-section to the respective axes R*a*, and that said lines are of equal length and that they are perpendicular to said axes R*a*. If the lens forms a virtual image, it will form virtual images of these perpendicular lines and these virtual images will be of greater length than the original perpendicular lines. Hence, as viewed in Fig. 3, the optical effect is to raise the left tip and to lower the right tip of each line-section.

Optionally and preferably, the number of lenses R per unit of length exceeds the number of lines L per unit of length. Thus, if there are 63 lenses R per inch, as measured in a direction perpendicular to the lens-axes R, the number of parallel lines L per inch, as measured in a direction perpendicular to said lines, may be 31 lines or less per inch. A ratio of two lenses per line is a good and preferred ratio, but the invention is not limited to this ratio, and the distance between adjacent lens-axes R*a* may be much less than one-half the distance between adjacent raster lines or adjacent printed lines.

The invention is not limited to the use of cylindrical lenses or to lenses of part-cylindrical shape.

Also, the invention is not limited to the formation of virtual images, although the formation of virtual images is greatly preferred.

A strip or area consists of a series of elemental thin lines.

According to my invention, I modify the light which is emitted from a raster line or other line or area or strip, preferably by refracting such emitted light, in order to produce images which are inclined to the original direction of said line or area or strip. These images are preferably separated from each other and said images are preferably parallel to each other. This separation is clearly visible if the line is thin. The entire television image is thus viewed, thus producing a much superior optical effect.

If a straight edge of a sheet of paper is viewed when said straight edge is in the position of lines L in Fig. 3, the image of said straight edge is serrated and said image has the shape of a series of successive ratchet teeth. If a strip of paper is placed in the position of a strip L in Fig. 3, the ratchet teeth of the image of the bottom edge of said strip of paper are inclined to the left, and the ratchet teeth of the image of the top edge of said strip of paper are inclined to the right. A television picture consists of a series of raster lines which are light-modulated by the cathode ray or beam of cathode rays, so as to emit more or less light along said raster lines. These raster lines may be considered as consisting of a series of thin elemental lines which are modified according to my invention, when they are viewed by the observer.

The block B is shown as having a substantial height *5a—5b*. However, this illustration of the height is only diagrammatic, and the height *5a* and *5b* may be selected to produce virtual images in which the point which is viewed is close to the half-cylindrical lens surface than the principal focus of said half-cylindrical lens surface.

I have described preferred embodiments of my invention, but numerous changes and omissions and additions can be made without departing from its scope.

I claim:

1. In combination with the phosphor screen of an electronic picture tube which has means for forming a series of raster lines on said screen, an assembly of a single row of cylindrical lenses which have substantially parallel longitudinal axes, said assembly being held and located in fixed relation relative to said phosphor screen with said longitudinal axes inclined to said raster lines, said lenses substantially abutting each other at their sides in said assembly, each said axis making an acute angle and an obtruse angle with said raster lines, each said lens being held and located in registration with respective separate registering parts of said raster lines, each said lens being held inclined to said raster lines and located to form an enlarged virtual image of each said registering part in which said registering parts are enlarged in only a single direction which is perpendicular to said axes, said virtual images of said registering parts being arranged on lines which are inclined to said raster lines.

2. A combination according to claim 1, in which said lenses have cylindrical surfaces whose diameter is substantially 0.40 millimeter.

3. A combination according to claim 1, in which said axes are straight.

4. A combination according to claim 1, in which said axes are of convexo-concave shape.

5. A combination according to claim 1, in which said picture tube has a light-permeable front wall, and said lenses are integral parts of a face of said wall.

6. A combination according to claim 1, in which said acute angle is 30° to 45°.

7. In combination with the phosphor screen of an electronic picture tube which has means for forming a series of parallel raster lines on said screen, an assembly of a single row of cylindrical lenses which have substantially parallel longitudinal axes, said assembly being held and located in fixed relative relation to said phosphor screen with said longitudinal axes inclined to said raster lines, said lenses substantially abutting each other at their sides in said assembly, each said axis making an acute angle and an obtuse angle with said raster lines, each said lense being held and located in registration with respective registering parts of said raster line, each said lens being held and located to form a reduced real image of each said registering part in which said registering parts are reduced in only a single direction which is perpendicular to said axes.

8. In combination with a phosphor screen of an electronic picture tube which has means for forming a series of parallel raster lines on said screen, said tube having a front glass wall, said phosphor screen being located inwardly of said front glass wall, a single row of cylindrical lenses which have substantially parallel longitudinal axes, said lenses being located internally of the front face of said glass wall, said lenses being held and located in fixed relation relative to said phosphor screen with said longitudinal axes inclined to said raster lines, each said axis making an acute angle and an obtuse angle with said raster lines, each said lens being held and located in registration with respective registering parts of said raster lines, each said lens being held and located to form an enlarged virtual image of each said registering part in which said registering parts are enlarged in only a single direction which is perpendicular to said axes, said lenses being sufficiently close to each other to provide virtual images of substantially the entire raster lines.

References Cited in the file of this patent

UNITED STATES PATENTS

| | | |
|---|---|---|
| Re 22,115 | Herbst | June 16, 1942 |
| 2,061,016 | Walton | Nov. 17, 1936 |
| 2,254,057 | Arni et al. | Aug. 26, 1941 |
| 2,260,228 | Moller et al. | Oct. 21, 1941 |
| 2,302,124 | Hergenrother | Nov. 17, 1942 |
| 2,351,294 | Schade | June 13, 1944 |
| 2,354,591 | Goldsmith | July 25, 1944 |
| 2,531,399 | Cawein et al. | Nov. 28, 1950 |
| 2,652,499 | Argabrite | Sept. 15, 1953 |
| 2,683,834 | Wright | July 13, 1954 |